(12) United States Patent
Kydd

(10) Patent No.: US 7,681,676 B2
(45) Date of Patent: Mar. 23, 2010

(54) ELECTRIC HYBRID VEHICLE CONVERSION

(76) Inventor: Paul Harriman Kydd, 32 Woodlane Rd., Lawrenceville, NJ (US) 08648

( * ) Notice: Subject to any disclaimer, the term of this patent is extended or adjusted under 35 U.S.C. 154(b) by 0 days.

(21) Appl. No.: 11/654,179

(22) Filed: Jan. 17, 2007

(65) Prior Publication Data

US 2007/0169970 A1 Jul. 26, 2007

Related U.S. Application Data

(60) Provisional application No. 60/761,231, filed on Jan. 23, 2006.

(51) Int. Cl.
*B60K 6/20* (2007.10)
(52) U.S. Cl. .................. 180/65.21; 180/65.22
(58) Field of Classification Search ........ 180/65.1–65.8
See application file for complete search history.

(56) References Cited

U.S. PATENT DOCUMENTS

| | | | | |
|---|---|---|---|---|
| 4,042,056 A | * | 8/1977 | Horwinski | ................. 180/65.2 |
| 5,562,178 A | * | 10/1996 | Worden et al. | ............... 180/291 |
| 6,116,363 A | * | 9/2000 | Frank | ........................ 180/65.25 |
| 6,332,257 B1 | | 12/2001 | Reed, Jr. et al. | |
| 6,367,570 B1 | * | 4/2002 | Long et al. | .................. 180/65.2 |
| 6,435,293 B1 | * | 8/2002 | Williams | ..................... 180/65.1 |
| 2005/0205313 A1 | * | 9/2005 | Gilmore et al. | ............. 180/65.2 |
| 2005/0211480 A1 | * | 9/2005 | Kejha | ......................... 180/65.2 |
| 2006/0000650 A1 | | 1/2006 | Hughey | |
| 2006/0030450 A1 | * | 2/2006 | Kyle | .............................. 477/3 |

OTHER PUBLICATIONS

Michael H. Westbrook, "The Electric Car" Institution of Electrical Engineers, Stevenage, UK/SAE Warrendale, Pa, 2001.

\* cited by examiner

*Primary Examiner*—Paul N Dickson
*Assistant Examiner*—Katy Meyer

(57) ABSTRACT

An assembly is described for converting an Internal Combustion (IC) vehicle to an IC-electric hybrid vehicle comprising a battery, a battery charger, a controller, an electric motor and a power transmission means involving a flexible rotational speed reduction to connect the motor to a drive shaft of the vehicle. The system can be made available in the form of a kit allowing those skilled in automobile mechanics to perform the conversion. Regenerative braking and provision of AC power from the vehicle can be made available as options.

12 Claims, 2 Drawing Sheets

ELECTRIC HYBRID VEHICLE CONVERSION

CROSS-REFERENCE TO RELATED APPLICATIONS

This application claims the benefit of U.S. Provisional Patent Application Ser. No. 60/761,231 filed Jan. 23, 2006, the complete disclosure of which is hereby expressly incorporated by reference.

CITED LITERATURE

Reed, et al, U.S. Pat. No. 6,332,257, Dec. 25, 2001
Gilmore, C. D., U.S. patent application Ser. No. 2005/0205313, Sep. 22, 2005
Hughey; Charles E. U.S. patent application Ser. No. 2006/0000650, Jan. 5, 2006 "The Electric Car" Michael H. Westbrook, Institution of Electrical Engineers, Stevenage, UK/SAE Warrendale, Pa., 2001
EPRI Portfolio 2006, P018-001 through -004
Kempton, W.; Tomic, J.; Letendre, S.; Brooks, A.; Lipman, T. Vehicle-to-Grid Power: Battery, Hybrid and Fuel Cell Vehicles as Resources for Distributed Electric Power in California, udel.edu/V2G, University of Delaware, 2001
AC Propulsion inc. acpropulsion.com/Veh_Grid_Power/Veh_grid_power.htm

FEDERALLY SPONSORED RESEARCH

None

BACKGROUND OF THE INVENTION

This invention relates to a hybrid internal combustion-electric drive system for a vehicle, and specifically to such a drive system that is retrofittable to existing internal combustion engine vehicles. The drive system includes a speed reduction system that enables a standard electric motor to propel the vehicle solely by electric power as a "strong hybrid". The electric portion of the drive system of this invention is intended to be recharged from an AC power source enabling the vehicle to obtain some or all of its energy from the electric grid and constituting a "plug hybrid".

There are two major electric hybrid vehicle concepts, series and parallel. In a series hybrid, the wheels are driven solely by the electric motor, which is powered by either the electric storage battery or the IC engine-generator or both. The battery is charged by the generator and by regenerative braking. A series hybrid is essentially an electric vehicle with an on-board engine-generator for battery charging.

In the more sophisticated parallel hybrid, the wheels are driven by both the electric motor and the IC engine. Parallel hybrids are in effect a conventional IC automobile with electric assist. The electric system amplifies the power of the IC engine during acceleration and recovers energy in braking. In this sense the electric system acts like a supercharger to give a small IC engine the performance of a large one. A "strong" parallel hybrid is one in which the electric system can provide enough torque and power that the vehicle can be operated on electric power alone.

The Toyota Prius Synergy drive has achieved a breakthrough in customer acceptance of the parallel hybrid concept, and is the first truly different automotive drive system to achieve fully commercial status since the automatic transmission a half-century ago. It features a planetary-geared system of an IC engine, an electric motor and a motor-generator[1].

The electric motor drives the wheels directly, and is fixed to the ring gear of the planetary system. The IC engine is fixed to the planet pinion carrier. The sun gear is fixed to the motor-generator. The motor-generator sends excess power from the IC engine to the battery. The electric motor can drive the vehicle by itself at low speeds, and it can augment the torque of the IC engine during acceleration and hill climbing. It can also recover energy from regenerative braking and return it to the battery. By varying the power flow between the two electrical machines, the system acts as a continuously variable ratio, electrically-coupled transmission. The Prius is a strong parallel hybrid up to about 35 miles per hour.

[1] "The Electric Car", page 158 and FIG. 10.9, 2001

There is a third hybrid concept, promoted by the Electric Power Research Institute (EPRI) and becoming increasingly popular and well known, called the Plug Hybrid Electric Vehicle (PHEV). This is an attempt to comply with the demand for Zero Emission Vehicles (ZEVs) by providing a parallel hybrid with a larger battery so that it can undertake at least short missions without ever starting the IC engine. The battery is recharged at home from the grid, thereby securing the considerable advantage of low cost energy relative to gasoline. The cycling performance of lithium-ion batteries is being extensively investigated for hybrid use, and it is the plug hybrid that can benefit most from the phenomenal performance of lithium-ion technology. The ability to store substantial amounts of energy for significant range with lithium makes the plug hybrid more than a shopping and commuting ZEV. It will give even a 6000-pound vehicle the range to be all-electric except for the occasional long trip, thereby bringing the economic and environmental advantages of electric propulsion to the entire passenger vehicle fleet.

EPRI is conducting a demonstration program to convert two Daimler Chrysler Sprinter vans to plug hybrids with a 20-30 mile range. This should yield real-world data on the feasibility and operation of plug hybrids in the near future.[2] The proposed system interposes an electric motor between a hydraulically operated clutch on the flywheel of the IC engine and the torque converter of an automatic transmission to provide for electric only drive with the clutch released or parallel hybrid operation with the clutch engaged.

[2] EPRI Portfolio 2006, P 018-001 through -004

Reed et al disclosed a similar approach in U.S. Pat. No. 6,332,257, Dec. 25, 2001, assigned to Chrysler Corp. A conventional manual transmission is converted to a parallel hybrid system by adding an electric motor driving the drive shaft of the transmission through a gear train. A hydraulic clutch and electric shifting actuators convert the manual system to an automatic transmission in which the gears are synchronized by controlling the electric motor speed, thereby achieving the advantage of automatic transmission operation without the use of a hydraulic torque converter with its associated losses. Again the system can operate in an electric-only mode with the clutch released or in a parallel hybrid mode with the clutch engaged. However, the patent envisions only a mild hybrid capability with a small 15 kW electric motor. The main objective is conversion of a mechanical transmission design to a more efficient automatic transmission system with minimal design change.

U.S. patent application 20060000650, Jan. 5, 2006 by Charles E., Hughey discloses a similar system in which the electric motor replaces the output shaft extension of the transmission to augment or replace the power of the internal combustion engine. The intention is to provide retrofit kits to allow existing vehicles to be easily converted to hybrids. It is stated that 15 to 20 variations in length and bolt patterns for the electric motor could replace transmission shaft extensions in over 80% of the light truck market.

U.S. patent application 20050205313, Sep. 22, 2005 by C. D. Gilmore et al describes a simpler system in which the electric motor is built into the driveshaft of a conventional automobile. The shaft contains a circumferentially mounted set of permanent magnets; a stator is mounted on the shaft with ball bearings allowing the shaft to rotate while the stator is constrained against rotation by a link to the vehicle chassis. Power can be applied to the motor from a battery through a controller with inputs from the accelerator, brake and other sensors to the vehicle electronic control module. The system is intended to be easily retrofitable to an existing vehicle as a conversion kit to convert it to a mild hybrid.

The intent of the present invention is similar to Hughey's and Gilmore's, namely to provide a retrofit kit, but with the addition of a speed reduction function to separate the motor from the drive shaft and provide the torque necessary to achieve strong hybrid operation on electricity only. This configuration allows the use of standard motors and other components to accomplish the conversion. Previous proposed attempts to provide conversion kits to create hybrid vehicles required specially designed electric motors, which increases initial cost substantially and requires an inventory of different motor types to convert different IC vehicles. The direct incorporation of the electric motor in the drive train in previous proposals either restricts the torque and power supplied electrically to a minimal augmentation of the IC engine or requires an inordinately large, heavy and expensive electric motor to match the torque output of the IC engine. The provision of a flexible speed reduction system between the electric motor and the drive shaft in the present invention allows a single inexpensive type of electric motor to power a wide variety of vehicles on electric power only. The provision of a flexible speed reduction system such as a timing belt allows for residual motion between the existing drive train due to engine vibration and/or the motion of the wheels over rough ground and the electric motor, which is preferably fixed to the chassis of the vehicle.

BRIEF SUMMARY OF THE INVENTION

This invention comprises an electric motor with a flexible speed reduction connection to the drive shaft of a conventional internal combustion engine vehicle to permit operation on either internal combustion or electric power or both together. It includes an electric storage battery and controller means to provide and control the electric power, as well as a battery charger to recharge the storage battery from the electric power grid. An optional inverter can provide AC power from the storage battery to operate tools and the like. Another optional feature is regenerative braking to recover power from the wheels or to allow battery charging from the IC engine.

It is the object of the present invention to provide a method and means to convert an IC vehicle with a conventional manual or automatic transmission into a strong, parallel plug hybrid vehicle.

It is a further object of this invention to make it easy to convert a conventional automobile or truck to a hybrid configuration with minimal changes and few additional parts of standard design and ready availability.

The invention enables the provision of retrofit kits and instructions which can be used to convert existing or new vehicles to parallel plug hybrid operation with minimal cost and effort.

BRIEF DESCRIPTION OF THE DRAWINGS

The means by which these objectives are achieved by the present invention are illustrated in the accompanying drawings, wherein.

DETAILED DESCRIPTION OF THE
INVENTION—THE PREFERRED
EMBODIMENT

Figure 1:
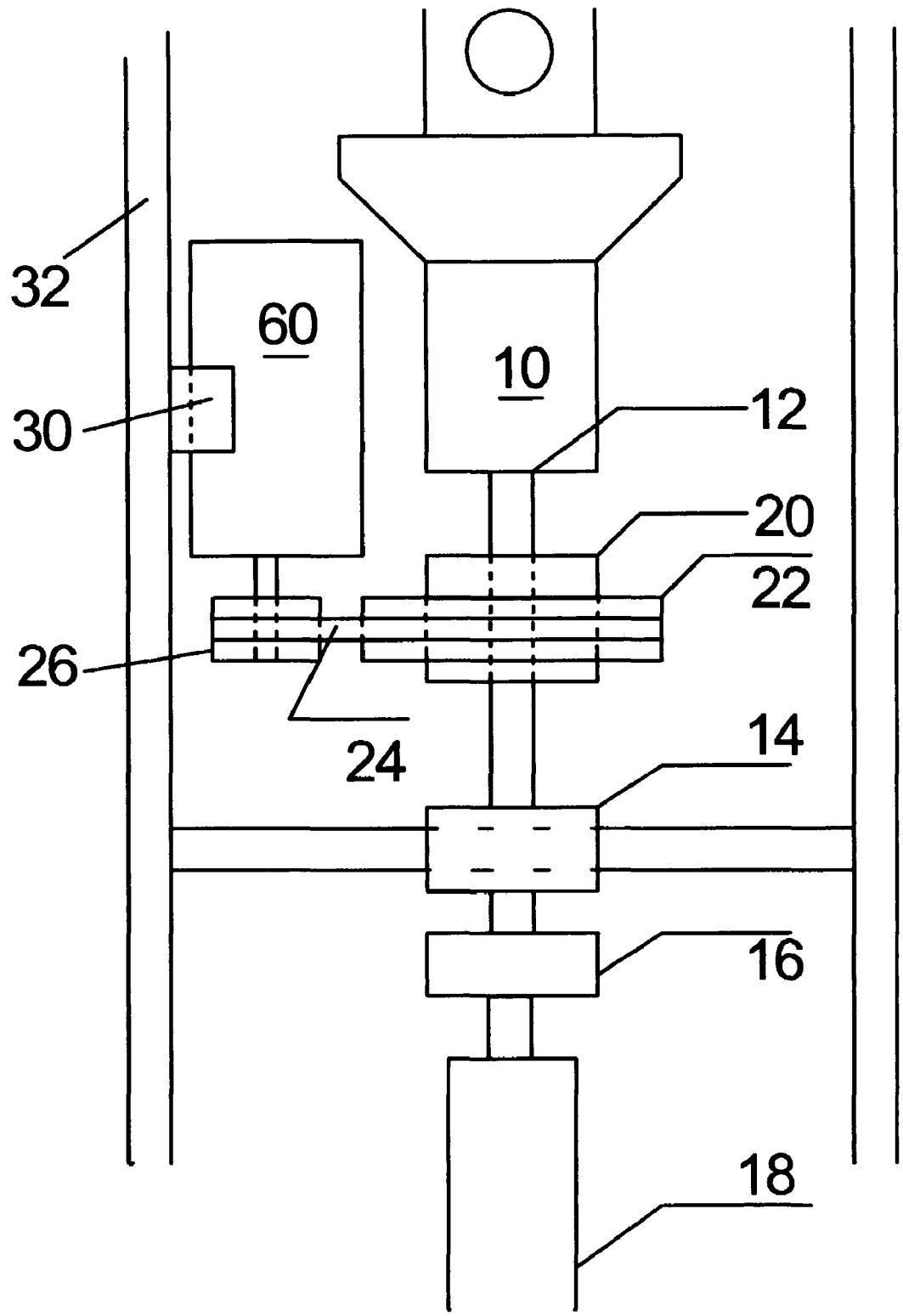
FIG. 1 is a schematic block diagram of the major mechanical components of the hybrid system according to the principles of the present invention.

FIG. 1 schematically illustrates the mechanical components of the hybrid drive system in which an internal combustion engine transmission 10 has an output shaft 12 which is supported by pillow block 14. The drive shaft drives propeller shaft 18 through universal joint 16 to propel the vehicle.

The added mechanical components of the hybrid system include clutch 20, mounted on and attached to output shaft 12 by a keyway or spline. For example, the outer diameter of the universal joint yoke engaging the splined end of output shaft 12 may be turned down and provided with a keyway to engage clutch 20. Clutch 20, may be of the roller ramp or cam type of overrunning clutch allowing relative motion in one direction but locking to the shaft in the other direction, for example the FormspragFSO-550 clutch from Warner Electric, Warren, Mich. The clutch is driven by a flexible speed reduction subsystem consisting of pulley 22, timing belt 24 and pulley 26. It is advantageous to make the pulley diameters as large as possible to maximize the belt life and minimize the effect of shaft motion relative to the chassis, For example belt 24 may be a two inch wide class H belt with half inch pitch, pulley 22 may be a 48 tooth pulley with a pitch diameter of 7.6 inches and pulley 26 may be a 24 tooth pulley of 3.7 inch pitch diameter. Electric motor 60 is mounted to the existing frame of the vehicle 32 by mounting 30, and may be either a variable speed AC or DC motor, preferably of adequate power to propel the vehicle at highway speeds, for example the FB1-4001 A 9 inch diameter series wound DC motor from Advanced DC Motors, Inc. Syracuse, N.Y., which is widely used in electric vehicle conversions. The power transmission system 22, 24, 26 provides speed reduction between the electric motor and the propeller shaft of the vehicle to match the motor to the requirements of the vehicle and allow a physically smaller motor to provide the requisite torque. Typically the shaft will run at approximately 3000 rpm at a vehicle speed of 65 mph while the electric motor will run at approximately 6000 rpm.

Figure 2:
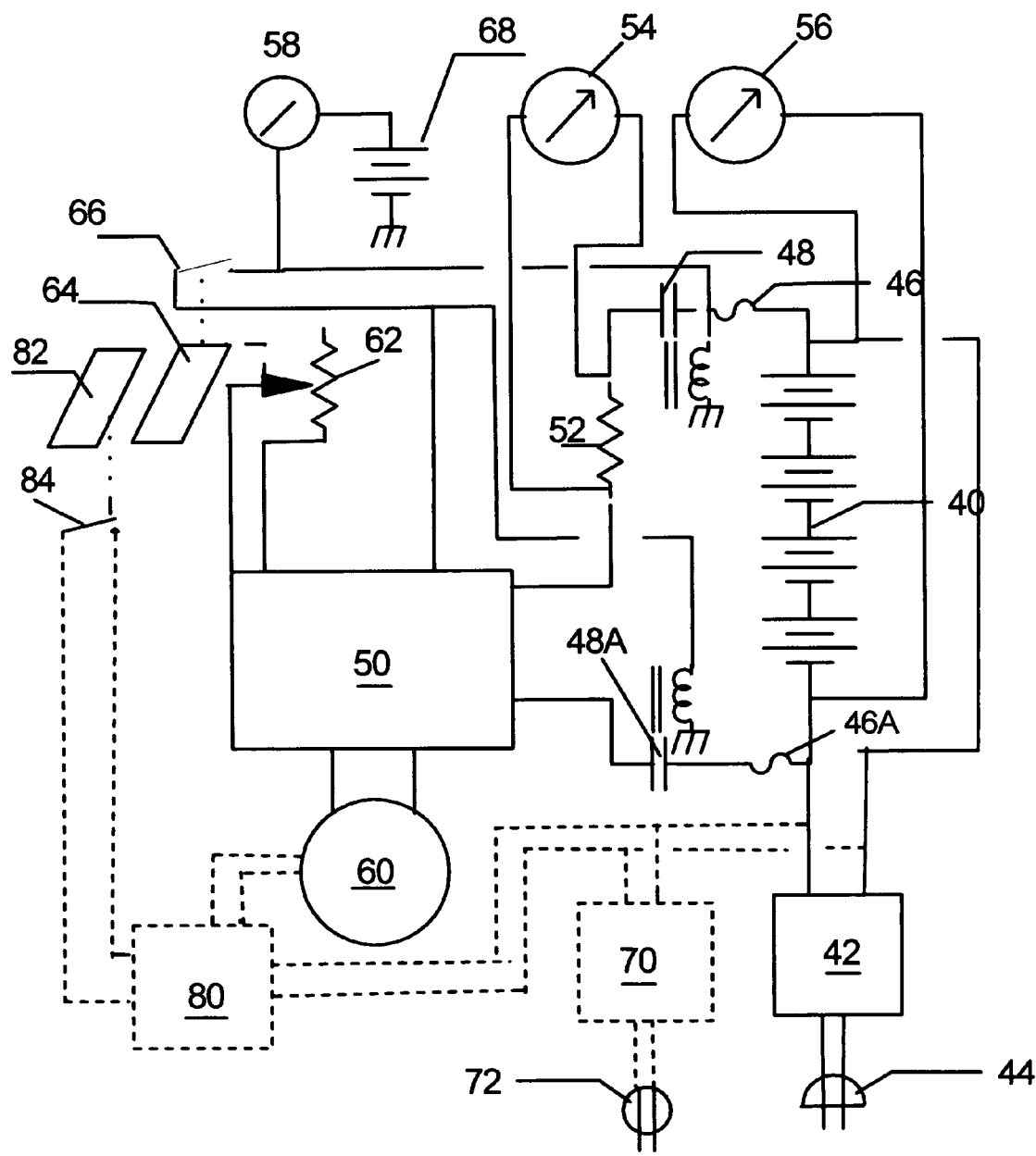
FIG. 2 is a schematic block diagram of the electrical components of the hybrid system according to the principles of the present invention.

The added components in the electrical system of this invention are shown schematically in FIG. 2. Electric power is supplied to charge battery 40 through charger 42 from plug 44 which may preferably be energized by widely available 120V or 240V single phase AC power. For example the Zivan NG3 3 kW switching charger available from Electric Conversions, Sacramento, Calif., is light and small enough to carry on board the vehicle. DC power is drawn from storage battery 40. A typical battery installation would comprise ten Group 24 Valve Regulated Absorbed Glass Mat batteries from GNB Industrial Division of Exide Corp. providing 60 Ampere hours of useable capacity at 120 Volts. The DC power is delivered through 300 Ampere fuses 46 and 46A and Curtis/Albright SW-200 contactors 48 and 48A to controller 50. Controller 50 may be a pulse width modulation controller for a DC motor such as the Curtis 1231C-8601 from Curtis PMC, Livermore, Calif. Current to the controller is monitored by shunt 52 and ammeter 54 to guide the driver as to the amount of power being used. The battery voltage is monitored by voltmeter 56 to provide information on the state of charge of the battery. Either or both of these functions may be performed by a more sophisticated electronic battery management system that can provide additional functions in monitoring battery state of charge and the charging process as well.

Primary contactor 48 is energized by 12 V from the existing ignition switch of the vehicle 58 and existing 12 V battery 68. The speed of the electric motor is typically governed by a variable resistance signal provided by potentiometer 62 actuated by a separate accelerator pedal, pot box 64, available from Curtis PMC. Pedal 64 is preferably located adjacent to the existing internal combustion accelerator pedal such that the driver can press either one or both together to achieve IC engine, electric motor or parallel hybrid operation. Pedal 64 also actuates microswitch 66 which provides 12 V power to controller 50 and secondary contactor 48A to provide power to motor 60 only when electric operation is intended.

While it is an objective of this application to show an embodiment of the invention that will work successfully, it will be understood by those skilled in the art that there are many variations in the mechanical and electrical components that will achieve the same objective of converting an existing automotive vehicle to strong parallel plug hybrid operation with minimal changes. The description of specific embodiments is not intended to limit the scope of the invention.

Additional Embodiments

Clutch 20 may be eliminated for simplicity without detracting from the main objective of the invention. The penalty for doing so is that the electric motor will rotate continuously, whether or not it is contributing to drive the vehicle. The result will be lost energy through windage in the cooling fan of the motor and additional wear on the brushes and the speed reduction drive to the motor when operating under IC engine power. These disadvantages are offset by lower initial cost through elimination of the clutch and the ability to drive the vehicle in reverse electrically and to recover energy by regenerative braking.

The electric motor 60 will also be engaged by the overrunning clutch 20 of the preferred embodiment when the vehicle is in reverse, but the amount of reverse operation is so small that the increased fuel consumption and loss in performance due to driving the electric motor in reverse from the drive shaft are negligible. This small deficiency can be eliminated at the cost of additional complexity by using an electric clutch at 20 and engaging it whenever the pot box pedal is depressed. Power from the reverse light or the reverse alarm of the vehicle can be used to operate a relay to reverse the electric motor so that it can supplement the internal combustion engine in either direction.

The substitution of an electric clutch or a manually controlled mechanical clutch for the overrunning clutch 20 can also provide regenerative braking in which energy from the vehicle is converted back into electric energy and stored in the battery 40. The optional regenerative battery charger 80 in FIG. 2 is actuated by existing brake pedal 82 and microswitch 84 to augment the existing hydraulic brake system, particularly at high speeds and on long down grades to improve the energy efficiency of the vehicle.

The speed reducing drive 22, 24, 26, is an essential part of this invention in that it allows for a particularly simple installation of the electric motor as a retrofit in an existing vehicle without altering the configuration of the drive train. It also enables an electric motor of reasonable size to provide the torque and power needed to propel the vehicle. Experience with electric conversions has shown that a speed reduction of between two and three is optimum to achieve acceptable highway performance with a readily available electric motor such as the FB1-4001A. Various types of V belt drives may be substituted for the timing belt drive described above as the preferred embodiment. A roller chain or a timing chain may be used for speed reduction with the proviso that they need increased protection from dirt and provision for lubrication. The timing belt drive of the preferred embodiment can accept residual relative motion and misalignment between the drive shaft and the electric motor 60, as can V belt drives and chain drives. This is an essential feature of the speed reduction system to allow the fixed electric motor to deliver power to the existing drive train which may move relative to the chassis of the vehicle due to the vibration of the IC engine or the motion of the driven wheels.

Motor 60 can be DC or AC. The requirement is for a motor that can provide adequate power at a variable speed. This includes conventional DC motors, preferably series wound traction motors, but shunt and compound DC motors can be used. With sufficient gear reduction to accommodate their limited torque capability, permanent magnet DC motors or brushless DC motors could be used. AC motors will require a variable frequency source of AC power to provide the required variable speed capability. Multiple motors can be used to drive the same speed reduction unit or multiple speed reduction units to achieve the required torque. A particularly suitable arrangement is two motors on opposite sides of the drive shaft to equalize the radial load on the shaft and its supporting bearings.

Motor 60 may be mounted in any convenient position relative to the drive shaft. The mounting shown in FIG. 1 is advantageous in that the output shaft 12 is supported at each end by bearings anchored to the chassis of the vehicle and provides a relatively fixed location for the pulley 22. Alternatively, the motor may be mounted to the rear of the pillow block bearing 14 with clutch 20 mounted on universal joint 16 as close to bearing 14 as possible to minimize relative motion due to motion of the rear wheels. Vehicles without a two part drive shaft and intermediate bearing may be converted by mounting the clutch 20 on the front universal joint of the drive shaft where motion of the shaft relative to the vehicle chassis is minimal. In vehicles with independent rear suspension such that the differential and the rear universal joint are fixed to the vehicle chassis, clutch 20 may be mounted on the rear universal joint.

Controller 50 is preferably a pulse width modulated controller to provide variable speed operation of DC motor 60. Other types of DC controllers can be used, such as field weakening for shunt wound motors, step contactors, and the like. AC drives, preferably utilizing three phase variable frequency inverters to convert DC power from the battery 40 to variable frequency AC can be used drive low-cost three-phase induction motors or more efficient synchronous AC motors. Similar equipment can be used to power a brushless DC motor or switched reluctance AC motor. All of these systems can be electrically reversed to provide power in both directions through an electric clutch.

The battery 40 can be of any type providing adequate storage capacity, power capability and life at an acceptable cost. Included are lead-acid batteries of all types including flooded lead-acid batteries, gel cells and absorbed glass mat batteries. Deep cycle batteries are required to accommodate electric operation for an extended period.

Suitable advanced battery types include nickel-cadmium for high power and extended life, nickel-metal hydride for increased capacity, and lithium-ion batteries for still greater capacity.

The charger 42 may also be of any type. It need not be located on board the vehicle, although this provides the optimum in convenience and ability to recharge anywhere. Typically plug 44 will be a connection to single phase 240 Volt AC power which is the standard supply Voltage for US household wiring, although single phase 120 Volts can be used with correspondingly longer charging time. Three-phase 208 Volt and 240 Volt power may be used where available. An inductive connection, as used on the General Motors EV1, is an alternative.

Another option is to take power from the vehicle battery for operating tools or recreation equipment in locations where AC power is not available or in case of emergency. Inverter 70 in FIG. 2 can convert DC power from battery 40 back to single or three-phase power to supply receptacle 72.

The hybrid system of this invention can be installed in various places in vehicles of many types. FIG. 1 is typical of installation in light trucks with frames and cross members. Installation in rear wheel drive unibody vehicles is also possible. Installation in front wheel drive vehicles is difficult, but in all wheel drive vehicles with a drive shaft to the rear wheels it is similar to that shown in FIG. 1. Four-wheel drive trucks and SUVs are also easily converted.

In a slightly different conversion technique with the same components, the clutch of this invention is attached to the front-wheel drive output shaft of the transfer case to drive the rear wheels, either in conjunction with the IC engine or with electric power only through the existing gear train. On front-wheel drive all-wheel drive vehicles, such as the Subaru, the electric motor will be mounted on the rear-wheel shaft and provide power to the front wheels through the gear train.

In some cases it may be desirable to locate the electric motor remotely from the speed reducing connection to the drive shaft and drive the speed reduction unit 20, 22, 24 and 26 with another long shaft from the motor. For example the motor may be located in the spare tire well behind the differential.

Operation—Preferred Embodiment

In operation the internal combustion engine is started in the usual way and provides reverse power, as well as powering all of the accessories, such as power steering, power brakes, heating and air conditioning and battery charging of the 12 Volt starting lighting and ignition battery which powers all of the other accessories in the usual way.

The electric motor 60 serves to provide some or all of the power to propel the vehicle in the forward direction. In this parallel configuration the electric motor serves to augment the internal combustion engine, improving its performance in acceleration and hill climbing while not impairing its performance otherwise by virtue of the overrunning clutch disengaging the electric motor. For electric-only operation the existing manual or automatic transmission can be shifted into neutral, the IC engine is left idling to drive the accessories, and the vehicle is propelled by the electric motor only.

In an alternate mode for vehicles with cruise control speed governing equipment, the transmission may be left in "drive" or high gear, the speed set at the speed limit, and the electric drive system used to its maximum capability. The IC engine will automatically provide any extra power required to reach highway speed for a heavy or nonaerodynamic vehicle plus power to maintain speed on hills and for acceleration. The electric system can thus provide its maximum contribution to fuel saving while not limiting the performance of the vehicle. This mode also extends the use of this invention to heavier vehicles that cannot be propelled satisfactorily by electric power alone.

By providing sufficient battery power and a battery charger 42 for the electric propulsion battery 40, the vehicle can be propelled in the forward direction solely or mostly by electric power derived from the electric grid via plug 44 for significant distances of 20 to 40 miles or more. In this plug hybrid mode, the vehicle consumes fuel only for accessory power and derives the bulk of its energy electrically. The range in plug hybrid mode is determined by the capacity of the battery and can be selected to match the most frequent daily use of the vehicle, for example commuting to work. In this mode a major reduction in fuel consumption can be accomplished with corresponding saving in cost per mile by replacing expensive motor fuel with low cost indigenous electric power. When the capacity of the battery is exhausted, the vehicle reverts to operation as a conventional IC engine automobile with no decrease in its performance except that occasioned by the additional weight of the mechanical and electrical components shown in FIGS. 1 and 2.

The vehicle can be operated as a conventional IC engine vehicle with excess shaft power used to charge the battery by adding the regenerative charger option 80. This mode of operation would be advantageous primarily in hilly country where excess energy on grades can be converted to electric power stored in the battery.

The addition of inverter option 70 could enable use of the vehicle as an emergency power source through receptacle 72 built into the vehicle, particularly in remote locations or in natural disasters. If the battery is exhausted, additional power may be obtained by jacking up one rear wheel and running the IC engine to charge the battery or provide electricity through regenerative charger option 80.

CONCLUSION, RAMIFICATIONS AND SCOPE

This invention comprises a simple assembly of mechanical and electric components which can be used to convert an internal combustion vehicle into a strong plug hybrid vehicle with minimal modification and cost. The method of this invention is applicable to a broad range of existing vehicles including particularly light trucks, SUVs rear wheel drive and all wheel drive automobiles.

The widespread adoption of this technology, which is fostered by the simplicity, low-cost and wide applicability of this invention can materially reduce the cost per mile of personal transportation for those who convert to plug hybrid operation. The cost of electric energy is typically half or less the cost of gasoline or diesel fuel per mile. The cost of petroleum can easily be expected to go even higher than it is today making the relative cost of electric energy derived from indigenous resources even more attractive. A widespread adoption of this technology could materially reduce petroleum demand by the developed and developing countries of the world with a significant improvement in balance of payments and international security. It will also cap the price of petroleum and avoid price shocks in the future.

The scope of this invention as described in the claims below is a system of components combined to enable an existing internal combustion vehicle to be driven by an electric system consisting of a battery, a controller, a motor and a power transmission system operating directly on the drive shaft of the vehicle. The power transmission system comprises a speed reduction system optionally having a clutch to disengage the electrical system from the drive shaft when the electrical system is not in operation. The speed reduction system allows a widely-available electric motor to provide enough torque and horsepower to drive the vehicle solely by electric power. The system also includes a charger for the onboard propulsion battery which can be plugged into an available household receptacle to recharge the battery, typically overnight or during the day when the vehicle is idle. A particularly desirable charger-supply combination is a two-way charger connected to single phase 240 V power that can take power from the grid to charge the battery or deliver power through an inverter to the grid for regulation and spinning reserve capacity. The provision of these services to the utilities via a large fleet of plug hybrid vehicles would be a valuable contribution to the utility economy, and would materially reduce the cost of electric personal transportation as described by Kempton et al and AC Propulsion, Inc.[3,4].

[3] Kempton, W.; Tomic, J.; Letendre, S.; Brooks, A.; Lipman, T. Vehicle-to-Grid Power: Battery, Hybrid and Fuel Cell Vehicles as Resources for Distributed Electric Power in California, udel.edu/V2G, University of Delaware 2001

[4] AC Propulsion inc. acpropulsion.com/Veh_Grid_Power/Veh_grid_power.htm

Options include a regenerative braking subsystem to recover energy and allow battery charging and emergency power generation from the IC engine, and an inverter to provide AC power from the battery through a vehicle-mounted receptacle for operating tools, recreational equipment or for emergency use.

I claim:

1. A method for converting an existing internal combustion vehicle to an internal combustion-electric hybrid comprising the steps of:
   providing an electric storage battery comprising a plurality of rechargeable cells in series adjacent connections, each cell having a positive and a negative terminal;
   connecting a charger to the battery to recharge it using alternating current electric power derived from an alternating current receptacle or an inductive connection;
   providing a controller receiving direct current electric power from the battery and an accelerator signal from the driver along with signal input devices and instruments which provide controllable electric power to an electric motor; and
   mechanically connecting an electric motor directly to a universal joint of a drive shaft of the vehicle by a power transmission subsystem at a point of minimum motion of the drive shaft relative to the frame of the vehicle;
   said power transmission subsystem comprising a flexible speed reduction drive such that the electric motor can provide some or all of the mechanical power required to propel the vehicle while accepting some relative motion between the existing vehicle drive train and the electric motor.

2. The method of claim 1, in which the battery is selected from the group consisting of: flooded lead-acid, gel cell lead-acid, absorbed glass mat lead-acid, nickel-cadmium, nickel-metal hydride, sodium-nickel chloride, sodium-sulfur, lithium- ion, and lithium-polymer batteries.

3. The method of claim 1 in which the charger is selected from the group consisting of: transformer-rectifier, silicon controlled rectifier, and electronically controlled switching circuit; and in which the charger is selected to match the specific requirements of the battery being used.

4. The method of claim 1 in which the charger can provide two-way flow of power by converting AC power from a receptacle to DC power to recharge the battery, or by converting DC power from the battery to AC power to the receptacle in response to an external demand.

5. The method of claim 1 in which the controller is chosen from the group consisting of: pulse width modulation controller, on/off switch, step switch, series/parallel switch, rheostat, and field weakening rheostat; and in which the controller is chosen to match the requirements of the DC motor.

6. The method of claim 1 in which the motor is a DC motor chosen from the group consisting of: series wound, shunt wound, compound wound, permanent magnet, and brushless DC motors.

7. The method of claim 1 in which the controller is an inverter providing variable frequency AC power from the battery DC power to control the speed of an AC motor, and in which the AC motor is chosen from the group consisting of: induction (squirrel cage), synchronous AC, and switched reluctance AC motors.

8. The method of claim 1 in which the speed reduction means is chosen from the group consisting of: timing belt, roller chain and timing chain.

9. The method of claim 1, further comprising the step of connecting the speed reduction means to the drive shaft via a clutch means which is chosen from the group consisting of: roller ramp clutch, cam clutch, ball clutch, electrically operated clutch, hydraulically operated clutch, and mechanically operated clutch.

10. The method of claim 1, further comprising the step of applying the speed reduction drive to one of the drive shafts of a four-wheel drive vehicle, allowing the electric motor to provide power to the gear train to drive the front and rear wheels of the vehicle in conjunction with the IC engine or by electric energy alone.

11. The method of claim 1, further comprising the step of installing a regenerative braking module to recover energy from the moving vehicle and to allow the IC engine to recharge the battery.

12. The method of claim 1, further comprising the step of installing an AC inverter to allow the provision of AC power from the vehicle battery through a conventional electrical receptacle or receptacles in response to an external demand.

* * * * *